United States Patent [19]

Teng

[11] Patent Number: 5,587,893
[45] Date of Patent: Dec. 24, 1996

[54] VIDEO DISPLAY HIGH VOLTAGE GENERATOR

[75] Inventor: David Teng, Taipei, Taiwan

[73] Assignee: Chung-Chin Chen, Alexandria, Va.

[21] Appl. No.: 491,600

[22] Filed: Jun. 16, 1995

[51] Int. Cl.$^6$ ............................. H02M 7/19; H01J 29/70; H05G 1/12
[52] U.S. Cl. ............................. 363/61; 315/411; 378/104
[58] Field of Search ................................. 363/59, 60, 61; 315/411; 345/191, 204, 208, 211; 348/377, 380, 805; 378/104, 101

[56] References Cited

U.S. PATENT DOCUMENTS

| | | | |
|---|---|---|---|
| 3,866,086 | 2/1975 | Miyoshi et al. | 315/411 |
| 4,500,879 | 2/1985 | Smith, III et al. | 340/739 |
| 4,731,565 | 3/1988 | Tagawa et al. | 315/411 |
| 4,816,978 | 3/1989 | Domenget et al. | 363/21 |
| 4,945,464 | 7/1990 | Gunn | 363/61 |
| 5,003,452 | 3/1991 | Sireul et al. | 363/61 |
| 5,034,667 | 7/1991 | Lendaro | 315/411 |

*Primary Examiner*—Peter S. Wong
*Assistant Examiner*—Adolf Berhane
*Attorney, Agent, or Firm*—Bacon & Thomas

[57] ABSTRACT

This invention relates to a video display high voltage generator. In the generator, the primary coil, the high voltage coil and the multiple foil high voltage capacitors of the multiplier are sequentially formed into a trausformer assembly on the insulating tube. The stepup capacitors are formed through an electrostatic induction of the metallized foil in the assembly, the two groups of the stepup capacitors are wound on the high voltage coil in opposite directions so as to nullify the voltages magnetically induced thereon, forming the wound metallized foils into pure capacitors without causing electromagnetic interference on the other equipments. The transformer assembly is mounted on the center pole of the ferrite casing and accomodated in the space provided by the casing. The magnetic path is formed by the center pole bases and rim of the ferrite casing. Through the invented casing design, the component layout and the foil winding method, little clearance is required for isolation between the high voltage coil and the multiplier; the metallized foil and the casing rim, resulting in product miniturization. Replacement of the ferrite casing for the thermoplastics casing in a conventional counterpart reduces the environmental problem.

14 Claims, 6 Drawing Sheets

VIDEO DISPLAY HIGH VOLTAGE GENERATOR

BACKGROUND OF THE INVENTION

This invention relates to a video display high voltage generator, and more particularly to a high voltage generator in which, the primary coil, the insulating foil, the high voltage coil and the multiple high voltage capacitors of the multiplier are sequentially formed into a transformer assembly on the insulating tube. The stepup capacitors are formed through an electro-static induction of the metallized foil in the assembly, the two groups of the foil stepup capacitors are wound on the high voltage coil in opposite directions so as to nullify the voltages magnetically induced thereon, reducing electromagnetic interference of the other equipments, little clearance being required for isolation between the high voltage coil and the multiplier; the metallized foil and the casing rim, resulting in produce size reduction and the elimination of the thermoplastic casing as being used in a conventional high voltage generator.

PRIOR ART

Figure 1:
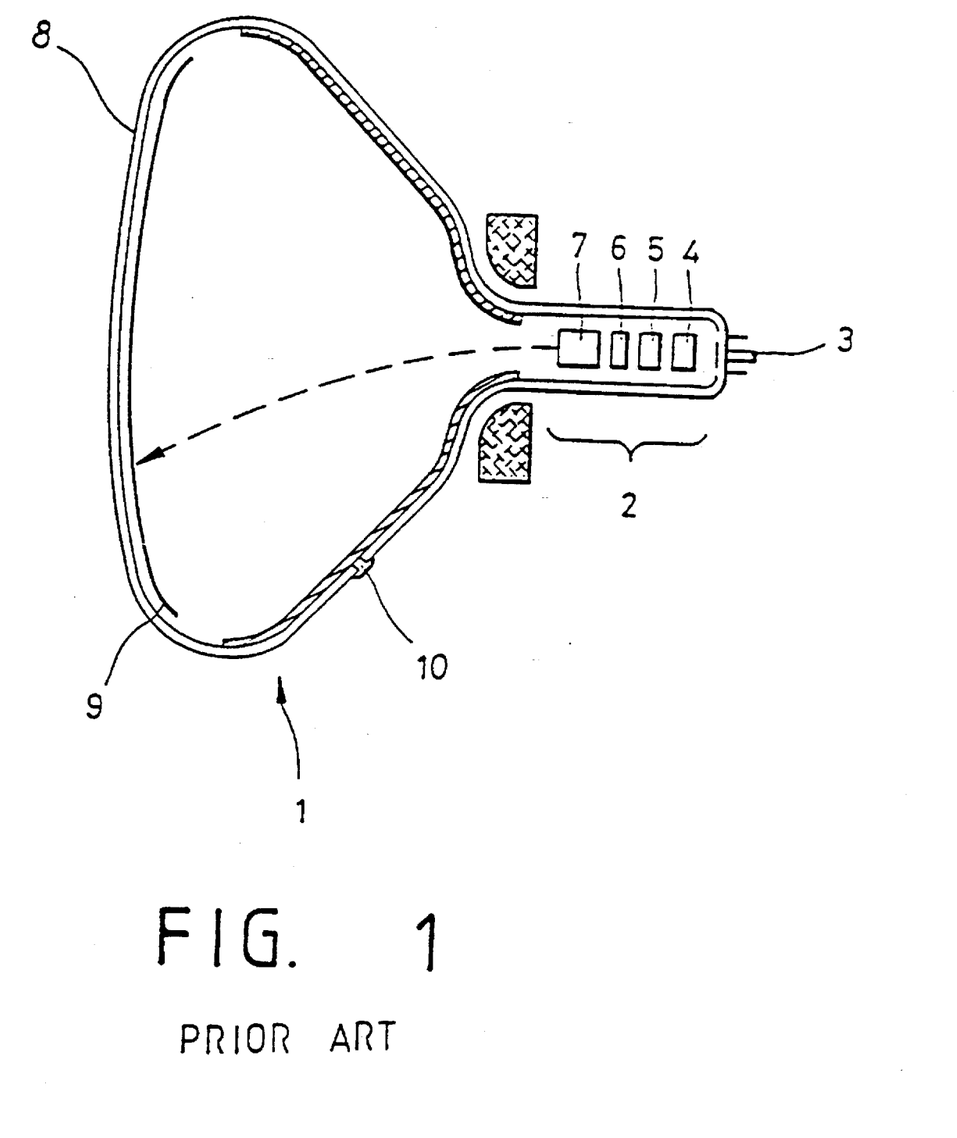
FIG. 1 represents an electron gun of a conventional cathode-ray tube for video display.

As well understood, the application of cathode-ray tube in the video display is very popular, viz, the conventional color TV's, high resolution monitors and even the super high resolution monitors for medical applications. They all incorporate the video cathode-ray tubes. As depicted in FIG. 1, the electron gun 2 of a conventional cathode-ray tube 1 is composed of a cathode 3 by which, electrons are produced and directed toward the G1 control grid 4. G1 contril grid 4 together with G2 plate 5 form a beam forming area (BFR), forcing the energized electrons into a tri-color electron beam in vertical array. The electron gun 2 also contains G3 focusing electrode 6 and G4 anode 7, which form a high voltage focusing lense, focusing the electron beams on the phosphor layer 9 of the screen of the cathode-ray tube. Video picture is thus produced on the plate 8 by the phosphor layer in coordination with the illumination of the electron beams. The high voltage for the conventional video display is supplied by a high voltage generator via the anode 10 therefore. The high voltage generator is an indispensible component in a cathode-ray display device, the high voltage value ranges from a few kilovolts to 30 kilovolts, according to application and the size and type of the cathode-ray tube.

Figure 2:
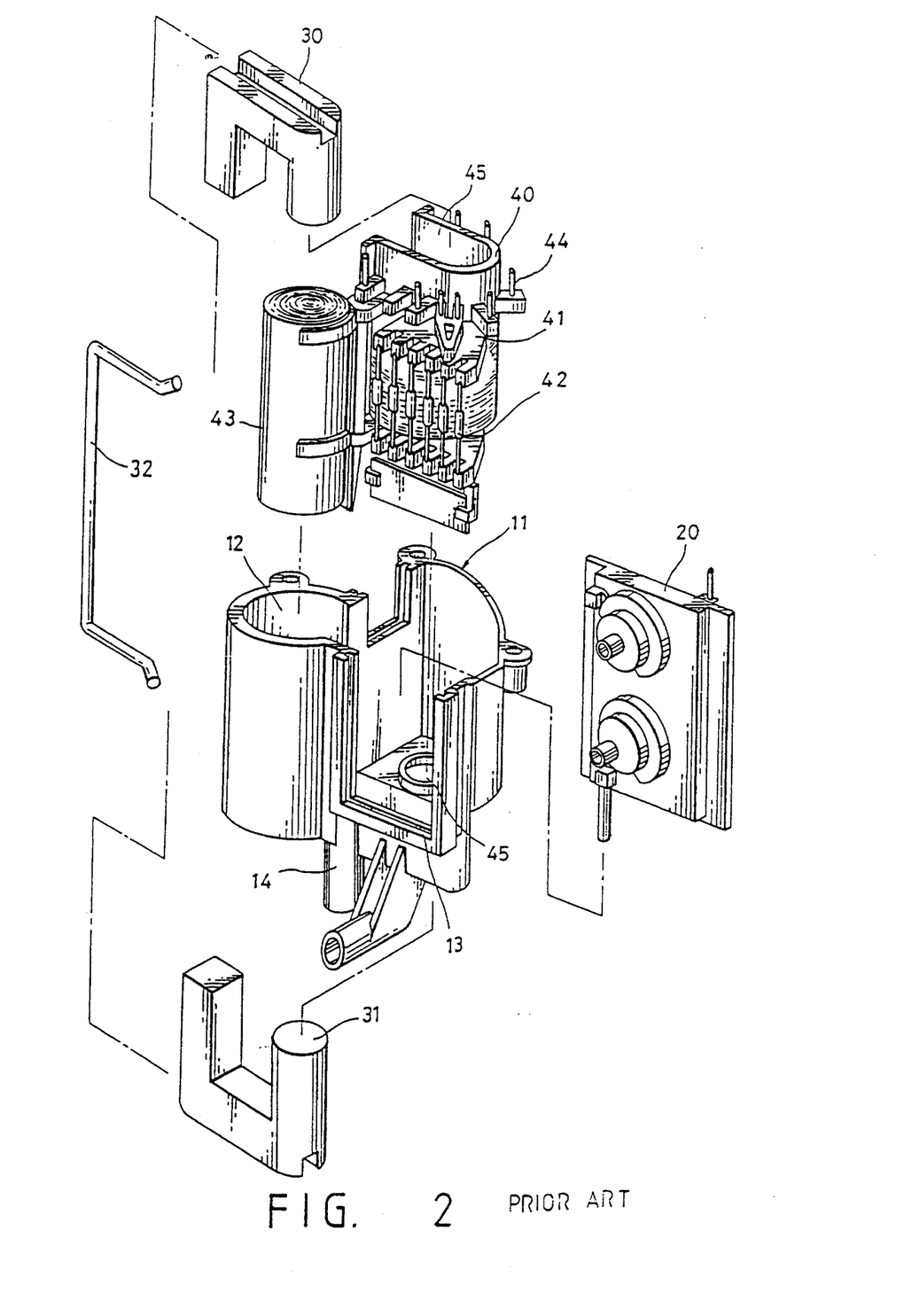
FIG. 2 is an exploded view of a conventional anode high voltage generator.

FIG. 2 shows the assembly diagram of a conventional anode high voltage generator, the generator is composed of a casing 11, in which is provided a space 12 for accomodating rectifiers 42, a coil 41 and a high voltage capacitor 43 as supported by a bobbin 40. Furthermore, a control device is inserted into an opening properly located on the casing. After the components are assembled in the space 12, encapsulant epoxy is cast in for component isolation and fixation. But the pins 44 on the bobbin should protrude beyond the cast epoxy so as to facilitate their connections with the related outside electric circuit, moreover. a magnetic path is formed by a pair of u-shapped core 30 and 31 which are fixed by a clamp 32 after the cores running through the center hole 45 of the bobbin 40. Through the cable from the high voltage exit 14 on the casing 11, the high voltage produced by the high voltage coil 41 is supplied to the anode 10 of the cathode-ray tube 1.

Figure 3:
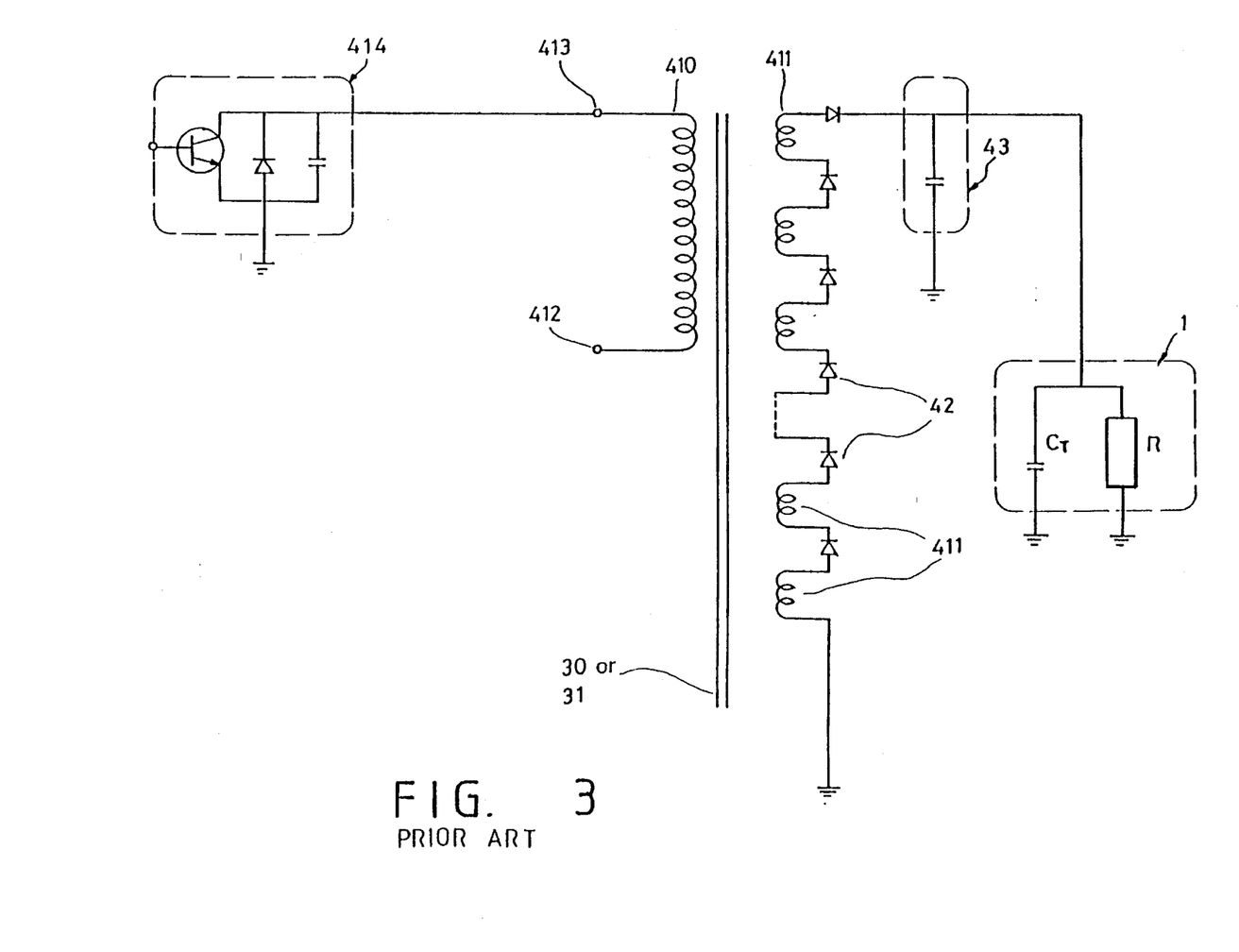
FIG. 3 is a schematic diagram of a circuit of a cathode-ray tube, peripheral circuit together with the conventional anode high voltage generator as depicted in FIG. 2.

FIG. 3 depicts a conventional anode high voltage generator with a cathode-ray tube and their peripheral circuitry. The anode high voltage generator is mainly composed of a primary coil 410, a multiple number of high voltage coils 411 and a high voltage capacitor 43. A terminal 412 of the primary coil 410 is connected to the power supply of a video display, while the other terminal is connected to the square wave generator (not shown in the figure) of the video display via a horizontal output switch 414. The horizontal switch 414 is periodically switched at a frequency between 15 kHz~120 kHz by the square wave generator; the high voltage coil 411 is split into several stepup coils by several high voltage rectifiers 42 (diode for example). A common magnetic path as formed by a pair of u-shaped core is running through these stepup coils, the high voltage capacitor 43 connected in parallel with the high voltage 411 serves to effectively smooth out the ripple on top of the high voltage. A terminal of the high voltage capacitor supplies the generated high voltage to the cathode-ray tube 1 of a video display. The cathode-ray tube has a load resistance in the order of $25 \times 10^6$ Ω and a capacitor of 1500 PF approximately.

For the purposes of isolation and fixation, the primary coil 410, the setup coil 411, the high voltage rectifier 42 and the high voltage capacitor 43, after being encased in a thermoplastic casing, are encapsulated in a polymeric insulating material (epoxy for example).

When the horizontal switch 414 is closed, the D.C. supply of the video display supplies current to one terminal 412 of the primary coil 410, storing up magnetic energy therein. Upon a swift interruption of the horizontal switch 414, a pulse of about 1000 Vac develops on the switch, and is stepped up to a required value by the high voltage coils 411 according to Transformer Principle. Depending on the design, the stepped-up voltage can be somewhere between 3 kv ~30 kv. The capacitor $C_T$ of the cathode-ray tube is charged up to this value. As the anode high voltage is supplied by the high voltage generator during a brief period, the horizontal output switch is open, and in normal operation, the load resistance R of the cathode-ray tube of the video display draws current from the capacitor $C_T$ most of the time, depleting the charges therein till the next pulse which charges the capacitor $C_T$ again to the required high voltage level. A ripple thus can be seen on the D.C. component of the high voltage. The heavier the current is, the greater the ripple will be.

But for the cathode-ray tube of a video display with a normal video quality, a great ripple is not acceptable. To reduce the ripple, an extra capacitor 43 is therefor required to be connected in parallel with the cathode-ray tube of the video display. As the capacitor 43 is a component of the high voltage generator, and for safety reason, the capacitor 43 must keep a safety clearance from the high voltage coils 411 and the high voltage rectifiers 43, or a high voltage corona can be developed by the high voltage pulse of the high voltage coils 411 in case the primary coil 410, the high voltage coil 411, the high voltage rectifier 42 and the high voltage capacitor 43 are not properly isolated and fixed by the polymeric material (epoxy as an example) after they are encased in the thermoplastic casing. The corona not only can produce an electromagnetic interference, but also can break down the high voltage generator or cause a fire hazard in the worst case.

Furthermore, as the isolating material and the thermoplastic casing are of poor thermal conductivity, the heat generated therein can heat the high voltage rectifier 42 and the high voltage capacitor 43 up to as high as 100° C. in an environment of 30° C., shortening their service life by an empirical factor of $3^{-0.1\Delta T}$ ($\Delta T$ is the temperature difference between the operating temperature and the design temperature).

For safety and reliablity reason, the capacitor must keep a safety clearance from the high voltage coil 411. Furthermore, to prevent the two adjacent stepup coils 411 from breakdown, a clearance of about 1 mm has to be provided in between. Thus the further away the high voltage 411 is from the primary coil 410, the looser its coupling is to the primary coil 410. Such a loose coupling will result in an unwanted ringing which may interferes with the cathode-ray tube display or the equipments in the vicinity.

The conventional high voltage generator for the anode of a cathode-ray tube video display is designed in such a way that it results in component layout and structural complexity. Furthermore, it also produce an environmental problem because of the use of isolating polymeric encapsulant and thermoplastic casing which are hardly recyclable presently.

SUMMARY OF THE INVENTION

Based on the problems as produced by the design and the production of the conventional anode high voltage generator for a cathode-ray tube, the inventor has invented a high voltage generator for the video display. In this invention, two groups of electrostatic-induction type foil high voltage capacitors are wound on a high voltage coil. Furthermore, as the two foil high voltage capacitors are wound in opposite directions, the magnetically induced voltages thereon nullify each other, effectively eliminate electromagnetic interference with other equipments. Since the winding of the high voltage foils stare directly at one terminal from the high voltage coil, the electrostatically induced voltage rises along the winding of the foil stepup capacitors, peaking at the other terminal of that high voltage capacitor, and reduces to ground at a terminal of the second high voltage capacitor, little clearance is required for the isolation between the high voltage capacitors and the high voltage coil. After sequentially forming the primary coil, the insulating foil, the high voltage coil and the two groups of high voltage foil capacitors into a transformer assembly on the insulating tube, the assembly is assembled onto the matched center poles of the top and the bottom ferrite casings. The required magnetic circuit is thus formed by the ferrite casings.

One purpose of this invention is to provide a video display high voltage generator, in which little clearance is required between the high voltage coil and the multiplier, the foil and the ferrite casing, effectively eliminating the risks of fire hazard of electromagnetic interference or the anode high voltage breakdown as may be encountered in a conventional high voltage generator.

The second purpose of this invention is to simplify the component layout and structure through clearance elimination which also leads to process simplification, cost reduction and product miniturization.

The third purpose of this invention is to avoid the environmental problem through eliminating the use of the thermoplastic casing as is used for a conventional high voltage generator.

DETAILED DESCRIPTION OF THE PREFERRED EMBODIMENT OF THE INVENTION

Figure 4:
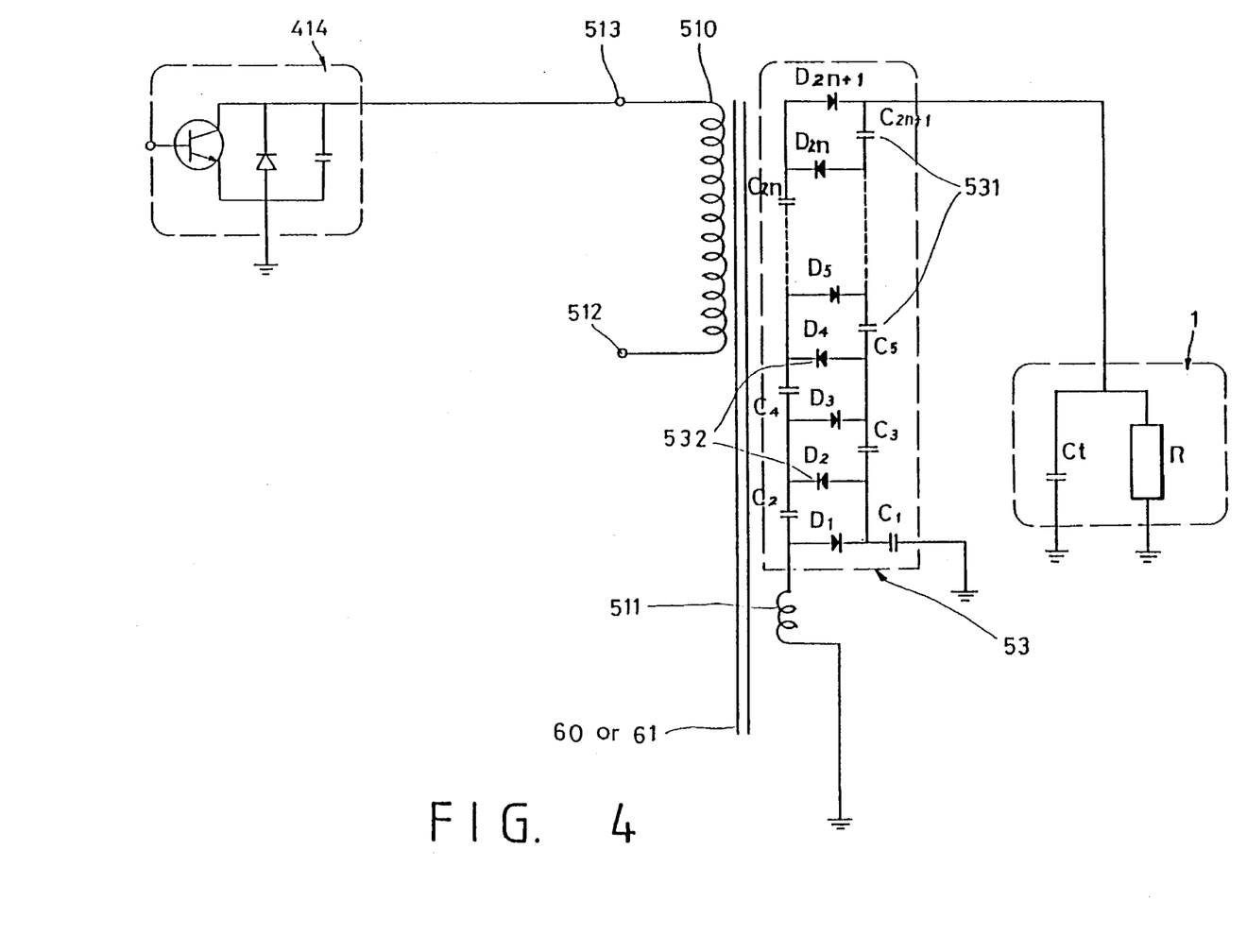
FIG. 4 is a schematic diagram of a circuit of a video display high voltage generator and the cathode-ray tube of a video display together with its peripheral circuit connections of this invention.

FIG. 4 shows the sketch of this invention of a video display high voltage generator and the cathoderay tube of a video display together its peripheral circuit connections. The high voltage generator is mainly comprised of a primary coil 510, a high voltage coil 511 and a multiplier 53; a terminal 512 of the primary coil 510 is connected with the power supply (not shown) of the electronic circuit of the video display; the other terminal 513 is connected with the square wave generator (not shown) of the electronic circuit of the video display via the horizontal output switch 414; the horizontal output switch 414 is operated at a frequency between 15 kHz~120 kHz by the square wave from the square wave generator; a terminal of the high voltage coil 511 is grounded; the other terminal is connected with the multiplier 53; the multiplier is comprised of a multiple number of high voltage rectifiers 532 (diode for example) and a multiple number of stepup capacitors 531. The core 61 and the core 62 are assembled to the coil to form a magnetic path. The other terminal of the multiplier 53 supplies the generated high voltage to the cathode-ray tube of a video display, the cathode-ray tube 1 has a load resistance of about $25 \times 10^6$ $\Omega$ and a total capacity of about 1500 PF.

Figure 5:
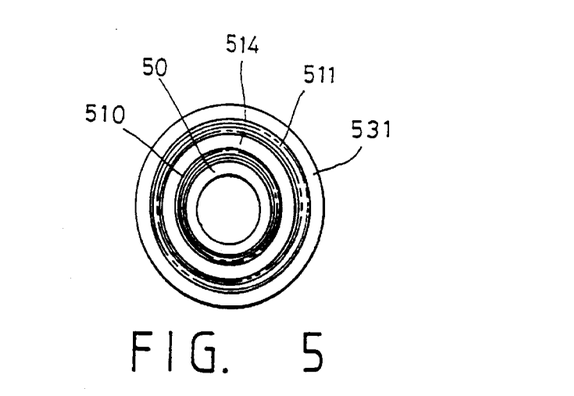
FIG. 5 is a sectional view of a video display high voltage generator as depicted in FIG. 4.

As shown in FIG. 5, the primary coil 510 of this invention of an anode high voltage generator is first wound on an insulating tube 50. Over the primary coil 510 is wound a layer of insulating foil 514 on which a high voltage coil 511 is wound. Finally, the metallized insulating foils 531 of the multiplier 53 is wound on the high voltage coil 511.

Figure 6:
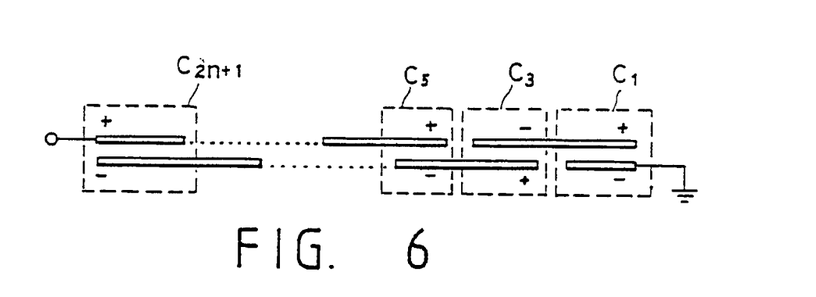
FIG. 6 is a schematic view, in section, of the stepup capacitors $C_2, C_4, \ldots, C_{2n}$ or $C_1, C_3, C_5, \ldots, C_{2n+1}$ of the two high voltage foil capacitors of this invention as depicted in FIG. 4.

In the preferred embodiment of this invention, the metallized foil stepup capacitors are divided in two groups. The first group is comprised of the stepup capacitors with a notation 2n in series; $C_2, C_4, \ldots, C_{2n}$ in sequence. The second group is composed of the stepup capacitors with a notation 2n+1 in series; $C_1, C_3, \ldots, C_{2n+1}$ in sequence. The value of n can be 1,2,3 ... according to actual application. As shown in FIG. 6, through electro-static induction process, the other end of the positive plate of one of two adjacent stepup capacitors (example: $C_2$ or $C_1$) of the foil high voltage capacitors (example: $C_2$ and $C_4$, or $C_1$ and $C_3$) becomes the negative plate of the other adjacent capacitor (example: $C_4$ or $C_3$). Through this electro-static induction process, two groups of the high voltage foil stepup capacitors 531 are formed. The negative plate of the stepup capacitor $C_2$ of the first group of the stepup capacitors is connected with the positive terminal of the high voltage coil 511; the negative plate of the same capacitor $C_2$ is also connected with the positive plate of $C_1$ of the second group of the stepup capacitors via the forward rectifier $D_1$ (example:diode); the positive plate of the stepup capacitor $C_{2n}$ of the first group of stepup capacitors is connected the positive plate of $C_{2n+1}$ of the second group of stepup capacitors via the forward diode $D_{2n+1}$; the negative plate of $C_1$ of the second group of the stepup capacitor is connected with ground; the negative plate of $C_{2n+1}$ of the second group of stepup capacitor is connected with the positive plate of $C_{2n}$ of the first group of stepup capacitors via the forward recitifier $D_{2n}$. If $C_{2n+1}$ is the terminal capacitor of the second group of the stepup capacitors, then the positive plate of the capacitor $C_{2n+1}$ is connected with the anode of the cathode-ray tube, so as to supply to the anode of the cathode-ray tube the high voltage produced by the multiplier 53.

The magnetically induced voltages on the two group of the stepup capacitors 531 nullify each other through the opposite winding directions of the stepup capacitors $C_2, C_4$, ..., $C_{2n}$ of the first group of the stepup capacitors 531 and $C_1, C_3$, ..., $C_{2n+1}$ of the second group of the stepup capacitors 531.

The voltage cancellation effectively renders the wound stepup capacitors 531 almost pure capacitors with little electromagnetic interference with other electronic devices. Furthermore, because the winding start of $C_2$ of the first group of the stepup capacitors 531 is connected with the positive terminal of the high voltage coil 511, the electrostatically induced electrical potential increases along the winding and peaks at the end of $C_{2n}$, and because via the rectifier $D_{2n+1}$, $C_{2n+1}$ of the second group of stepup capacitors 531 continues the winding from that peak potential, and reduces the electrostatically induced electric potential to ground level. So little safety clearance is required between the high voltage coil 511 and the foil stepup capacitors 531 and between the foil of the stepup capacitors and the rim of the core which is at ground potential in actual application. The ripple on the D.C. high voltage can be effectively reduced with a proper value of the stepup capacitors.

Figure 7:
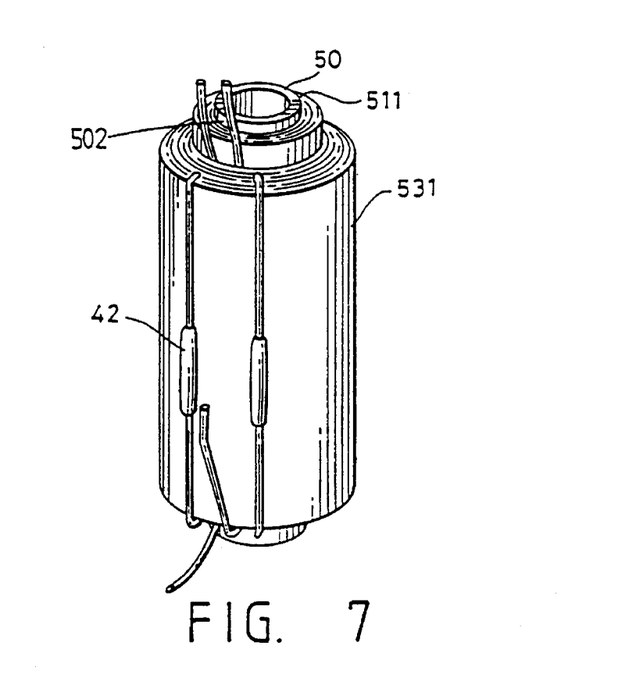
FIG. 7 is a perspective view of the primary coil, the insulating foil, the high voltage coil and the foil high voltage capacitors on the insulating tube of this invention as depicted in FIG. 4.

As shown in FIG. 7, upon sequentially forming the primary coil 510, the insulating foil 514, the high voltage coil 511 and the foil stepup capacitors 531 into a transformer assembly on the insulating tube 50, the assembly is mounted onto the center pole 612 in the space 611 as provided by the ferrite casing pair 60,61 which is closed at one end and open at the other end. Once the ferrite casings are clamped with a device 613, their center poles meet in the center hole 501 of the insulating tube 50; their rims meet by outer foil surface of the stepup capacitors 531, forming a magnetic path together with the bases of the ferrite casing. Furthermore, as shown in FIG. 7, the insulating tube length can be so dimensioned, that a sufficient clearance formed between the casing base and the primary coil 510, the insulating foil 514, the high voltage coil 511, and the stepup foil capacitors 531. A clearance 502 is also provided between the insulating tube and the ferrite casings to ensure a required matching of the ferrite casings 60 and 61.

In another embodiment of this invention, the upper ferrite casing 60 is a disc with a center pole 612. The primary coil 510 is wound on the center pole 612, the insulating foil 514 is wound on the primary coil 510, the high voltage coil 511 is wound on the insulating foil 514, the metallized insulating foil of the multiplier 531 of the multiplier 53 is wound on the high voltage coil 511. One end of the lower casing 61 is open to match the upper casing, the other end is closed. A space 611 is provided in the lower casing 61 for accomodating the components wound onto the center pole 612 of the upper casing 60. Once clamped with a device 615, the lower casing 61, the center pole and the disc of the upper casing match, forming an enclosed body with the rims of the casings, a magnetic path with the center poles and the rims of the casing 60 and 61.

Figure 8:
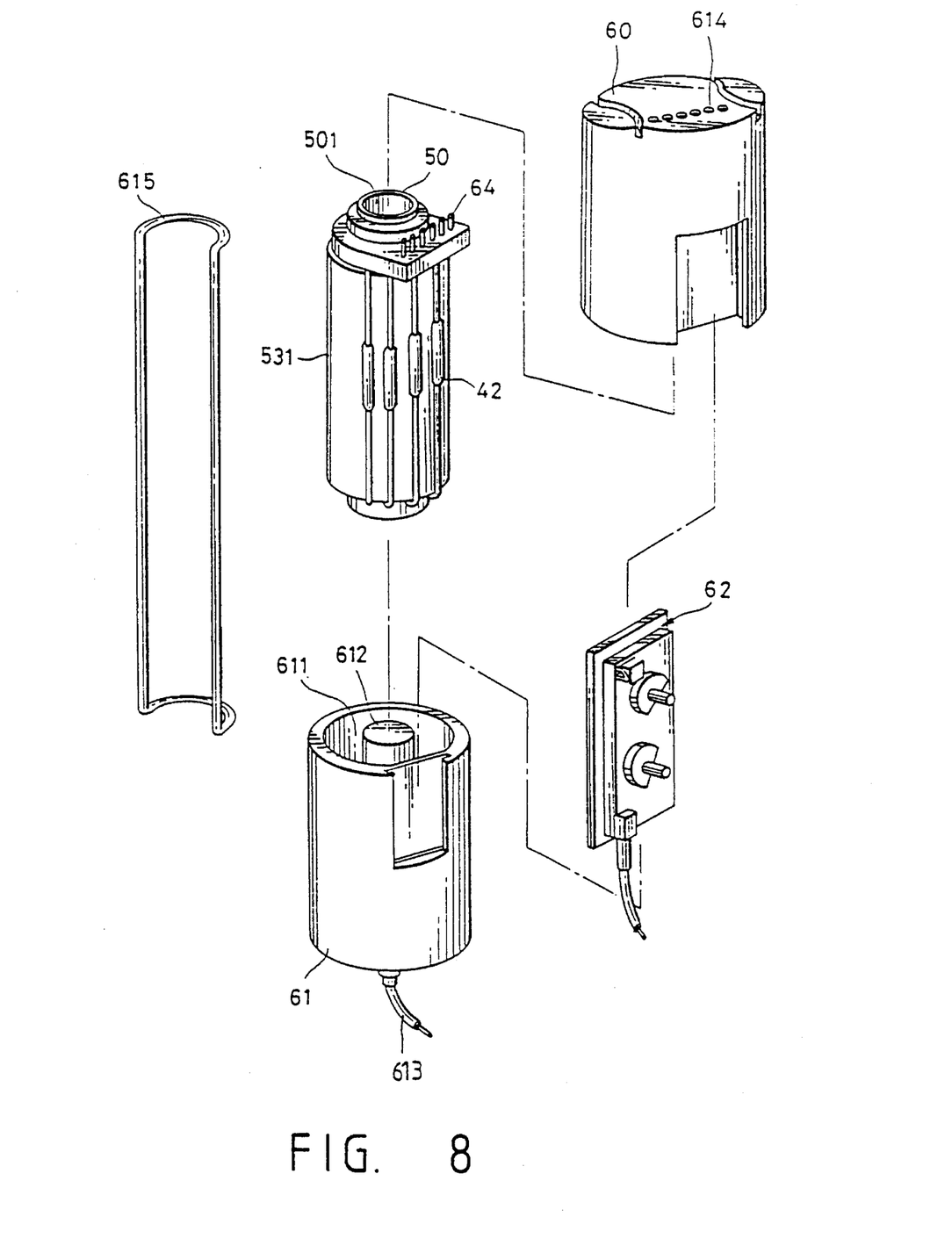
FIG. 8 is an exploded view of this invention as depicted in FIG. 4.

Since the insulation can be sufficiently provided in advance by the raw materials for the primary coil 510, the high voltage coil and the metallized foil for the stepup capacitors, the insulating foil 514 as wound between the primary coil 510 and the high voltage coil 511 (or that between the metallized for stepup capacitors) only serves as a component for extra isolation, not a necessary component. Again, as shown in FIG. 8, a control device 62 can be mounted on to the casings of the high voltage generator of this invention for adjusting the focus voltage as supplied to the cathode-ray tube of a video display from the anode high voltage generator. The generated high voltage is supplied to the anode via an anode cable 613 connected from the cathode-ray tube to the generator through a properly located hole on the casing. Furthermore, at least a hole 614 is properly provided on the casings for a pin 64 of the primary coil to protrude, beyond the casing, and to be connected with the related electric circuit. Furthermore, the encapsulating and fixation epoxy can be injected into the casings through one of the holes 614 as provided.

Base on the above description, this invention eliminates the use of the toxic thermoplastic casing as is used for a conventional anode high voltage generator. Further more, the unrequired high voltage corona, the consequent electromagnetic interference, device breakdown and the potential fire hazard is avoided by the elimination of the air bubble as produced in an improper epoxy encapsulation process for a conventional high voltage generator. Product miniturization is possible with the elimination of the clearances as required for in a conventional voltage generator.

It is to be understood that the embodiments are designed for purposes of illustration only, and are not intended as a definition of the limits and scope of the invention disclosed.

What is claimed is:

1. A high voltage generator for the anode of the cathode-ray tube of a video display, comprising:

a pair of cores;

a primary coil isolatedly wound on the center poles of the cores, having one terminal connected with the D.C. power supply of an electric circuit of the video display and the other terminal connected with a square wave generator of the video display via a horizontal switch of the electric circuit, said horizontal switch being periodically switched by a square-wave from the square wave generator;

a high voltage coil wound on the primary coil, having one terminal connected with ground and the other terminal connected with a multiplier;

a multiplier, comprising a plurality of metallized foil high voltage stepup capacitors and high voltage rectifiers, said foil high voltage stepup capacitors of the multiplier being wound on the high voltage coil, said multiplier having one terminal connected with the high voltage coil and the other terminal supplying the generated high voltage to the anode of the cathode-ray tube of the video display, the rectifiers therein being used to connect the foil stepup capacitors of the multiplier for stepping up the high voltage coil output to a required high voltage;

cores run through the center hole of the primary coil, and containing the components therein to form a magnetic path.

2. A high voltage generator according to claim 1, wherein said multiplier comprises at least two groups of foil high voltage stepup capacitors, the first group of the foil high voltage stepup capacitors comprising of 2n for stepup capacitors serially connected through electrostatic induction, which is sequentially idendified as $C_2, C_4, \ldots, C_{2n}$, the second group of the foil high voltage stepup capacitors comprising of 2n+1 for stepup capacitors serially connected through electrostatic induction, which is sequentially identified as $C_1, C_3, \ldots, C_{2n+1}$, the n assumes a number among 1,2,3, . . . as required in application, the negative plate of the terminal capacitor $C_2$ of the first group of the stepup capacitors being connected to the positive terminal of the high voltage coil, and to the positive plate of the terminal capacitor $C_1$ of the second group of the foil high voltage stepup capacitors via the forward rectifier $D_1$, the positive plate of the other terminal capacitor $C_{2n}$ of the first group of the foil high voltage stepup capacitor being connected with the positive plate of the other terminal capacitor $C_{2n+1}$ of the second group of the foil high voltage stepup capacitors via the forward rectifier $D_{2n+1}$; the negative plate of the terminal capacitor $C_1$ being connected with ground; the negative plate of the other terminal capacitor $C_{2n+1}$ of the second group of the foil high voltage stepup capacitors being connected with the positive plate of the capacitor $C_{2n}$ of the first group of the foil high voltage stepup capacitors via a forward rectifier.

3. A high voltage generator according to claim 1 or 2, wherein the high voltage produced by the high voltage generator for the anode of the cathode-ray tube of a video display can be supplied to power the other electronic element.

4. A high voltage generator according to claim 3, wherein the capacitor $C_{2n+1}$ is the terminal capacitor of the second group of the foil high voltage stepup capacitor of the high voltage generator, then the high voltage produced by the multiplier can be supplied to the anode of the cathode-ray tube via an electrical connection from the positive plate of the capacitor $C_{2n+1}$ to the anode of the cathode-ray tube.

5. A high voltage generator according to claim 3, wherein the other end of the positive plate of the foil capacitors $C_2, C_4, \ldots, C_{2n}$ or $C_1, C_3, \ldots, C_{2n+1}$ can be used for the negative plates of the adjacent foil capacitors.

6. A high voltage generator according to claim 3, wherein said two groups of the foil stepup capacitors of the high voltage generator may be wound on the high voltage coil in opposite directions to nullify the voltages magnetically induced thereon.

7. A high voltage generator according to claim 3, wherein the first group of the foil high voltage stepup capacitors having one of the winding start connected with the high voltage coil, the electrostatically induced potential on said capacitors being rised along the winding, peaking at the winding finish of said capacitors, faring to ground level along the second group of the foil high voltage stepup capacitors which is properly connected with the winding finish of the first group of the foil high voltage stepup capacitors via the rectifiers.

8. A high voltage generator according to claim 1, wherein the core comprising of an upper ferrite casing and a lower ferrite casing, one end of the upper or the lower casings being open while the other end being closed, the space provided in the core accomodating the primary coil, high voltage coil and the foil high voltage capacitors isolatedly wound on the insulating tube, the center poles of the core in the center hole of the insulating tube and the rims around the high voltage foil matching, and forming a magnetic path together with the bases once clamped with a device, an anode cable properly connected from the high voltage generator to the anode of the cathode-ray tube for supplying the generated high voltage to the anode.

9. A high voltage generator according to claim 8, wherein the lengh of the insulating tube can be so dimensioned that a sufficient safety clearance is provided between the top and the bottom of the casing, the primary coil, the high voltage coil and the foil high voltage capacitors, so that the clearance allows center pole, the rim of the upper and the lower ferrite casings to match into an envelope.

10. A high voltage generator according to claim 1, wherein the core is comprised of a ferrite upper casing and a ferrite lower casing, the upper casing is a disc with a center pole on which the primary coil, the high voltage coil and the foils of the high voltage capacitors are sequentially wound, the lower casing having open at one end and closed at the other end, the open end of the lower casing providing a space to accomodate the components wound on the center pole of the upper casing, once clamped with a device, the rims around the foil of the high voltage capacitors, the center poles of the upper and the lower casings matched into an envelope and a magnetic path, the anode cable connected frown the envelope to the anode of the cathode-ray tube providing the generated high voltage to the anode of the cathode-ray tube.

11. A high voltage generator according to claim 8 or 10, wherein a control device can be properly inserted on to the ferrite casing for adjusting the focusing voltage as supplied from the high voltage generator to the cathode-ray tube of the video display.

12. A high voltage generator according to claim 8 or 10, wherein at least a hole is porperly formed in the casing for supplying the encapsulant into the space around the encased components with the encapsulant being used to fix and to isolate the encase components.

13. A high voltage generator according to claim 8 or 10, wherein at least a hole is properly formed in the casing for electrical connection between the related outside circuit and the high voltage generator by the terminal through that hole.

14. A high voltage generator according to claim 8 or 10, wherein for increasing electrical isolation, an isolation layer can be designed in between the primary coil and the high voltage coil, the high voltage coil and the high voltage foils of the multiplier.

\* \* \* \* \*